United States Patent
Auschra et al.

(10) Patent No.: US 7,199,177 B2
(45) Date of Patent: Apr. 3, 2007

(54) PIGMENT COMPOSITION CONTAINING ATRP POLYMERS

(75) Inventors: Clemens Auschra, Freiburg (DE); Andreas Mühlebach, Frick (CH); Ernst Eckstein, Rheinfelden (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 206 days.

(21) Appl. No.: 10/690,652

(22) Filed: Oct. 22, 2003

(65) Prior Publication Data

US 2004/0143032 A1 Jul. 22, 2004

Related U.S. Application Data

(63) Continuation-in-part of application No. 09/869,549, filed as application No. PCT/EP99/10395 on Dec. 27, 1999, now abandoned.

(30) Foreign Application Priority Data

Dec. 31, 1998 (EP) .................................. 98124860

(51) Int. Cl.
*C08L 53/00* (2006.01)
(52) U.S. Cl. .................................................. 524/505
(58) Field of Classification Search ................. 524/505
See application file for complete search history.

(56) References Cited

U.S. PATENT DOCUMENTS

| | | | |
|---|---|---|---|
| 4,925,765 A | 5/1990 | Madeleine | 430/110 |
| 5,772,741 A * | 6/1998 | Spinelli | 106/31.25 |
| 5,789,487 A | 8/1998 | Matyjaszewski et al. | 525/301 |
| 5,807,937 A | 9/1998 | Matyjaszewski et al. | 526/135 |
| 5,886,118 A * | 3/1999 | Percec | 526/146 |
| 5,889,083 A * | 3/1999 | Zhu | 523/161 |
| 6,063,834 A | 5/2000 | Kappele et al. | 523/160 |
| 6,087,416 A | 7/2000 | Pearlstine et al. | 523/160 |
| 6,268,433 B1 | 7/2001 | Barkac et al. | 525/92 |
| 6,326,420 B1 | 12/2001 | Olson et al. | 523/334 |
| 6,391,391 B2 | 5/2002 | Barkac et al. | 427/386 |
| 6,462,125 B1 | 10/2002 | White et al. | 524/560 |
| 6,512,060 B1 * | 1/2003 | Matyjaszewski et al. | 526/111 |

FOREIGN PATENT DOCUMENTS

| | | |
|---|---|---|
| EP | 0218436 | 4/1987 |
| EP | 0323181 | 7/1989 |
| EP | 0329873 | 8/1989 |
| EP | 0518225 | 12/1992 |
| EP | 0962473 | 12/1999 |
| WO | 97/18247 | 5/1997 |
| WO | 99/03938 | 1/1999 |
| WO | 99/62961 | 12/1999 |

* cited by examiner

*Primary Examiner*—Callie Shosho
(74) *Attorney, Agent, or Firm*—Joseph C. Suhadolnik

(57) ABSTRACT

The present invention relates to a composition containing ATRP polymers and dispersible inorganic or organic pigment particles. The pigment composition is useful for preparing coating compositions, prints, images, inks or lacquers and other disperse systems.

2 Claims, No Drawings

PIGMENT COMPOSITION CONTAINING ATRP POLYMERS

This is a continuation-in-part of application Ser. No. 09/869,549, filed on Jun. 29, 2001, now abandoned which is a 371 of PCT/EP 99/10395 filed on Dec. 27, 1999.

The present invention relates to a composition containing ATRP polymers and dispersible inorganic or organic pigment particles, a process for preparing the composition, a pigment dispersion containing ATRP polymers and dispersible inorganic or organic pigment particles, a process for preparing the pigment dispersion and to the use of the pigment dispersion for preparing coatings, images, lacquers and others.

The present invention specifically relates to a pigment composition containing ATRP (Atom Transfer Radical Polymerization) polymers characterized by a low polydispersity range, preferably a polydispersity range which is lower than 3, and an enhanced monomer to polymer conversion efficiency and predetermined molecular weights and to a pigment dispersion prepared from the pigment composition.

Dispersions containing pigments and polymer additives are used in an almost unlimited number of different technical applications, e.g. as coating materials, printing inks, for coloring plastic materials, including fibers, glasses, or ceramic products, for formulations in cosmetics, or for the preparation of paint systems, in particular automotive paints and dispersion colors.

The function of polymers in pigment dispersions is manifold. They may act as solubilisers in the given dispersing agent, e.g. water or organic solvents. Suitable polymers are also needed as stabilizers to prevent precipitation or flocculation. Polymers may also improve the gloss of the pigment dispersion or enhance its rheology. Depending on the type and polarity of the dispersing agent, e.g. water, organic solvents or mixtures thereof, polymers of variable structure are chosen. In view of ecological requirements, the use of aqueous pigment dispersions is particularly preferred.

Group transfer polymerization (GTP) is a method for producing acrylic A-B block copolymers of defined structure. With a hydrophilic, "B" block (neutralized acid or amine containing polymers), these polymers are useful for preparing water based pigment dispersions. The hydrophobic "A" blocks (homo- or copolymers of methacrylate monomers) are surface active and associate with either pigment or emulsion polymer surfaces, cf. H. J. Spinelli, *Progress in Organic Coatings* 27 (1996), 255–260.

The GTP method still has several drawbacks. The hydrophilic/hydrophobic "balance" is obtained by copolymerizing a limited group of specific acrylate and methacrylate monomers. Moreover, the polymerization initiators used in this method, such as the silyl ketene acetals disclosed in U.S. Pat. No. 4,656,226, e.g. 1-trimethylsilyloxy-1-isobutoxy-2-methylpropene, are highly reactive and this necessitates the use of carefully dried and purified reactants, which limits the use of this method in industrial applications.

Therefore, it is desirable to employ an improved method of polymerization for preparing polymers of defined structure for use in pigment dispersions.

U.S. Pat. No. 4,581,429 discloses a free radical polymerization process by controlled or "living" growth of polymer chains which produces defined oligomeric homopolymers and copolymers, including block and graft copolymers. A process embodiment is the use of initiators of the partial formula R'R"N—O—X. In the polymerization process the free radical species R'R"N—O∘ and ∘X are generated. ∘X is a free radical group, e.g. a tert.-butyl or cyanoisopropyl radical, capable of polymerizing monomer units containing ethylene groups. The monomer units A are substituted by the initiator fragments R'R"N—O∘ and ∘X and polymerize to structures of the type: R'R"N—O-A-X (A: polymer block). Specific R'R"N—O—X initiators mentioned are derived from cyclic structures, such as 2,2,6,6-tetramethylpiperidine, or open chain molecules, such as di-tert.-butylamine.

WO 96/30421 discloses a controlled or "living" polymerization process of ethylenically unsaturated polymers such as styrene or (meth)acrylates by employing the ATRP method. According to this method initiators are employed which generate a radical atom such as ∘Cl, in the presence of a redox system of transition metals of different oxidation states, e.g. Cu(I) and Cu(II), providing "living" or controlled radical polymerization.

It has surprisingly been found that polymers obtained by controlled or "living" polymerization process of ethylenically unsaturated polymers, such as styrene or (meth)acrylates, by employing the ATRP method or related methods are particularly useful for preparing pigment compositions or pigment dispersions prepared from these compositions.

The present invention relates to a composition comprising
a) 0.1–99.9% by weight of a block copolymer of the formula:

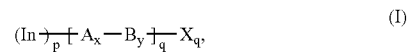

wherein:
In represents a polymerization initiator fragment of a polymerization initiator capable of initiating atomic transfer radical polymerization (ATRP) of ethylenically unsaturated monomers in the presence of a catalyst capable of activating controlled radical polymerization;
p represents a numeral greater than zero and defines the number of initiator fragments;
A and B represent polymer blocks which differ in polarity and consist of repeating units of ethylenically unsaturated monomers;
x and y represent numerals greater than zero and define the number of monomer repeating units in polymer blocks A and B;
X represents a polymer chain terminal group; and
q represents a numeral greater than zero; and
b) 0.1–99.9% by weight of dispersible inorganic or organic pigment particles, provided that thermosetting compositions are excluded.

The present invention also relates to a pigment dispersion comprising a dispersed phase consisting of
a) a block copolymer of the formula I, wherein In, A, B, X, x, y, p and q are as defined above; and
b) dispersed pigment particles;

and a liquid carrier selected from the group consisting of water, organic solvents and mixtures thereof.

The pigment dispersions are useful for variety of uses, e.g. the preparation of inks or printing inks in printing processes, such as flexographic, screen, packaging, security ink, intaglio or offset printing, for pre-press stages and for textile printing, for office, home or graphic applications, for paper goods, for pens, felt tips, fiber tips, card, wood, (wood) stains, metal, inking pads, or inks for impact printing, (with impact-pressure ink ribbons), or for the preparation of colorants, for coatings, e.g. paints, for textile decoration and industrial marking, for roller coatings or powder coatings or powder coatings or for automotive finishes for high-solids, low-solvent, water containing or metallic coating materials or for water-containing formulations, water-containing paints, or for the preparation of pigment plastics for coatings, fibers, platters or mold carriers, or for non-impact printing material, for digital printing, for thermal wax transfer printing, for inkjet printing or for thermal transfer printing, or for the preparation of color filters, especially for visible light in the range from 400 to 700 nm, which can be used for the production of liquid crystal displays (LCDs) or charge combined devices (CCDs) or for the preparation of cosmetics, toners, or polymeric ink particles for the preparation of toners for dry copy toners and liquid copy toners, or electrophotographic toners. The toners can be prepared in masterbatches and be used in turn in masterbatches for the preparation of colored plastics.

The terms and definitions used in the specification of the present invention preferably have the following meanings:

In the context of the description of the present invention, the term alkyl comprises methyl, ethyl and the isomers of propyl, butyl, pentyl, hexyl, heptyl, octyl, nonyl, decyl, undecyl and dodecyl. An example of aryl-substituted alkyl is benzyl. Examples of alkoxy are methoxy, ethoxy and the isomers of propoxy and butoxy. Examples of alkenyl are vinyl and allyl. An example of alkylene is ethylene, n-propylene, 1,2- or 1,3-propylene.

Some examples of cycloalkyl are cyclopropyl, cyclobutyl, cyclopentyl, cyclohexyl, methylcyclopentyl, dimethylcyclopentyl and methylcyclohexyl. Examples of substituted cycloalkyl are methyl-, dimethyl-, trimethyl-, methoxy-, dimethoxy-, trimethoxy-, trifluoromethyl-, bis-trifluoromethyl- and tris-trifluoromethyl-substituted cyclopentyl and cyclohexyl.

Examples of aryl are phenyl and naphthyl. Examples of aryloxy are phenoxy and naphthyloxy. Examples of substituted aryl are methyl-, dimethyl-, trimethyl-, methoxy-, dimethoxy-, trimethoxy-, trifluoromethyl-, bis-trifluoromethyl- or tris-trifluoromethyl-substituted phenyl. An example of aralkyl is benzyl. Examples of substituted aralkyl are methyl-, dimethyl-, trimethyl-, methoxy-, dimethoxy-, trimethoxy-, trifluoromethyl-, bis-trifluoromethyl or tris-trifluoromethyl-substituted benzyl.

Some examples of an aliphatic carboxylic acid are acetic, propionic or butyric acid. An example of a cycloaliphatic carboxylic acid is cyclohexanoic acid. An example of an aromatic carboxylic acid is benzoic acid. An example of a phosphorus-containing acid is methylphosphonic acid. An example of an aliphatic dicarboxylic acid is malonyl, maleoyl or succinyl. An example of an aromatic dicarboxylic acid is phthaloyl.

The term heterocycloalkyl embraces within the given structure one or two and heteroaryl one to four heteroatoms, the heteroatoms being selected from the group consisting of nitrogen, sulfur and oxygen. Some examples of heterocycloalkyl are tetrahydrofuryl, pyrrolidinyl, piperazinyl and tetrahydrothienyl. Some examples of heteroaryl are furyl, thienyl, pyrrolyl, pyridyl and pyrimidinyl.

An example of a monovalent silyl radical is trimethylsilyl.

Component a)

In a block copolymer (I) the group In represents the polymerization initiator fragment of a polymerization initiator:

  (II)

wherein In, p and q are as defined above, which is capable of initiating atomic transfer radical polymerization of the fragments A and B and subsequently proceeds by a reaction mechanism known under the term ATRP or related methods. A suitable polymerization initiator, which contains a radically transferable atom or group ∘X, is described in WO 96/30421 and WO 98/01480. A preferred radically transferable atom or group ∘X is ∘Cl or ∘Br, which is cleaved as a radical from the initiator molecule and subsequently replaced after polymerization as a leaving group with a N→O compound. The index p is 1 if one group ∘X is present (q=1) in the polymerization initiator (II). The polymerization initiator may also contain more than one groups ∘X. In this case q may be 2 or 3. The polymerization initiator may also be bifunctional. In this case p and q may be two.

A preferred polymerization initiator (II) is selected from the group consisting of $C_1$–$C_8$-alkyl halides, $C_6$–$C_{15}$-aralkylhalides, $C_2$–$C_8$-haloalkyl esters, arene sulfonyl chlorides, haloalkanenitriles, α-halbacrylates and halolactones.

Specific initiators are selected from the group consisting of α,α'-dichloro- or α,α'-dibromo-xylene, p-toluenesulfonylchloride (PTS), hexakis-(α-chloro- or α-bromomethyl) benzene, 2-chloro- or 2-bromopropionic acid, 2-chloro- or 2-bromoisobutyric acid, 1-phenethyl chloride or bromide, methyl or ethyl 2-chloro- or 2-bromopropionate, ethyl-2-bromo- or ethyl-2-chloroisobutyrate, chloro- or bromoacetonitrile, 2-chloro- or 2-bromopropionitrile, α-bromo-benzacetonitrile and α-bromo-γ-butyrolactone (=2-bromodihydro-2(3H)-furanone).

The term polymer comprises oligomers, cooligomers, polymers or copolymers, such as block, multi-block, star, gradient, random, comb, hyperbranched and dendritic copolymers as well as graft or copolymers. The block copolymer units A and B contain at least two repeating units of polymerizable aliphatic monomers containing one or more olefinic double bonds.

The aliphatic monomer units present in A and B differ in polarity and contain one or more olefinic double bonds. The difference in polarity is obtained by copolymerizing polymer blocks A and B with different amounts of monomers, which contain hydrophilic functional groups present in ionic surfactants such as the carboxylate, sulfoxylate, phosphonate, ammonio, alkylated ammonio or hydroxy groups. In a preferred embodiment of the invention the content of monomers containing functional groups in each polymer block A or B differs from the other polymer block by at least 20% by weight. Particularly preferred are acrylic A-B block copolymers of defined structure prepared by the ATRP method or related methods. With a hydrophilic "B" block (neutralized acid or amine containing polymers), the presence of these polymer blocks is useful for preparing water based pigment dispersions. The hydrophobic "A" blocks (homo- or copolymers of methacrylate monomers) are surface active and associate with either pigment or emulsion polymer surfaces.

Both polymer blocks A and B may contain repeating units of polymerizable monomers having one olefinic double bond. These monomers are selected from the group consisting of styrenes, acrolein and acrylic or $C_1$–$C_4$-alkylacrylic acid-$C_1$–$C_{24}$-alkyl esters.

Suitable styrenes may be substituted at the phenyl group by one to three additional substituents selected from the group consisting of hydroxy, $C_1$–$C_4$-alkoxy, e.g. methoxy or ethoxy, halogen, e.g. chloro, and $C_1$–$C_4$-alkyl, e.g. methyl or ethyl.

Suitable acrylic or $C_1$–$C_4$-alkylacrylic acid-$C_1$–$C_{24}$-alkyl esters are selected from the group consisting of methyl, ethyl, n-butyl, isobutyl, tert.-butyl, 2-ethylhexyl, isobornyl, isodecyl, lauryl, myristyl, stearyl, and behenyl methacrylates and the corresponding acrylates.

Examples of monomers containing two or more double bonds are diacrylates of ethylene glycol, propylene glycol, neopentyl glycol, hexamethylene glycol or of bisphenol A, 4,4'-bis(2-acryloyloxyethoxy)-diphenylpropane, trimethylolpropane triacrylate or tetraacrylate.

In a preferred embodiment of the invention the polymer block B is more hydrophilic as compared to polymer block A and consists of higher amounts of monomers carrying functional groups. The monomers are selected from the group consisting of acrylic or $C_1$–$C_4$-alkylacrylic acid or anhydrides and salts thereof, acrylic or $C_1$–$C_4$-alkylacrylic acid-mono- or -di-$C_1$–$C_4$-alkylamino-$C_2$–$C_4$-alkyl esters and salts thereof, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$-alkyl)$_3$silyloxy-$C_2$–$C_4$-alkyl esters, acrylic or $C_1$–$C_4$-alkylacrylic acid-($C_1$–$C_4$-alkyl)$_3$silyl-$C_2$–$C_4$-alkyl esters, acrylic or $C_1$–$C_4$-alkylacrylic acid-heterocyclyl-$C_2$–$C_4$-alkyl esters and salts thereof, $C_1$–$C_{24}$-alkoxylated poly-$C_2$–$C_4$-alkylene glycol acrylic or $C_1$–$C_4$-alkylacrylic acid esters, acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkylamino$C_2$–$C_4$-alkylamides and salts thereof, acrylic or $C_1$–$C_4$-alkylacryl-amino-$C_2$–$C_4$alkylamides, acrylonitrile, methacrylonitrile, 4-aminostyrene and salts thereof, di-$C_1$–$C_4$-alkylaminostyrene and salts thereof, vinyl substituted heterocycles, styrene sulfonic acid and salts, vinylbenzoeic acid and salts, vinylformamide and amidosulfonic acid derivatives.

The above-mentioned salts are obtained by reaction with organic or inorganic acids or by quatemization.

Specific examples of the above-mentioned functional monomers are acrylic acid or methacrylic acid, acid anhydrides and salts thereof, e.g. acrylic acid or methacrylic acid-($C_1$–$C_4$-alkyl)ammonium salts, acrylic acid or methacrylic acid-($C_1$–$C_4$-alkyl)$_3$NH salts, such as the acrylic acid or methacrylic acid tetramethylammonium salt, the tetraethyl-ammonium, trimethyl-2-hydroxyethylammonium or the triethyl-2-hydroxyethylammonium salt, the acrylic acid or methacrylic acid trimethyl ammonium salt, the triethylammonium, dimethyl-2-hydroxyethylammonium or the dimethyl-2-hydroxyethylammonium salt.

Specific examples of $C_1$–$C_4$-alkylacrylic acid-mono- or -di-$C_1$–$C_4$-alkylamino-$C_2$–$C_4$-alkyl esters are acrylic or methacrylic acid-2-monomethylaminoethylester, acrylic or methacrylic acid-2-dimethylaminoethylester or the 2-monoethylaminoethyl or 2-diethylaminoethyl esters or the acrylic or methacrylic acid-2-tert.-butylaminoethylester as well as the corresponding salts of these amino substituted (meth)acrylates.

Specific examples of acrylic or $C_1$–$C_4$-alkylacrylic acid-hydroxy-$C_2$–$C_4$-alkyl esters are acrylic or methacrylic acid-2-hydroxyethylester (HEA, HEMA) or acrylic or methacrylic acid-2-hydroxypropylester (HPA, HPMA).

Specific examples of the above-mentioned $C_1$–$C_4$-alkylacrylic acid-heterocyclyl-$C_2$–$C_4$-alkyl esters are acrylic or methacrylic acid-2-(N-morpholinyl)-ethyl ester. Acrylic or $C_1$–$C_4$-alkylacrylic acid-silyloxy-$C_2$–$C_4$-alkyl esters are exemplified by acrylic or methacrylic acid-2-trimethylsilyloxyethylester (TMS-HEA, TMS-HEMA). Acrylic or $C_1$–$C_4$-alkylacrylic acid-($C_1$–$C_4$-alkyl)$_3$silyl-$C_2$–$C_4$-alkyl esters are exemplified by acrylic or methacrylic acid-2-trimethylsilylethylester or acrylic or methacrylic acid-3-trimethylsilyl-n-propylester. $C_1$–$C_{24}$-Alkoxylated poly-$C_2$–$C_4$-alkylene glycol acrylic or $C_1$–$C_4$-alkylacrylic acid esters are exemplified by acrylates and methacrylates of the formula:

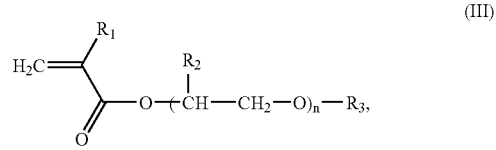

wherein $R_1$ and $R_2$ independently of one another represent hydrogen or methyl and $R_3$ represents $C_1$–$C_{24}$-alkyl, such as methyl, ethyl, n- or isopropyl, n-, iso-, or tert.-butyl, n- or neopentyl, lauryl, myristyl or stearyl or aryl-$C_1$–$C_{24}$-alkyl, such as benzyl or phenyl-n-nonyl, $C_1$–$C_{24}$-alkylaryl or $C_1$–$C_{24}$-alkylaryl-$C_1$–$C_{24}$-alkyl.

Acrylic or $C_1$–$C_4$-alkylacrylic acid-heterocyclyl-$C_2$–$C_4$-alkyl esters are exemplified by acrylic or methacrylic acid-2-(2-pyridyl, -1-imidazolyl, -2-oxo-1-pyrrolidinyl, -4-methylpiperidin-1-yl, or -2-oxo-imidazolidin-1-yl)-ethyl ester.

The above-mentioned acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkylamino-$C_2$–$C_4$-alkylamides and acrylic or $C_1$–$C_4$-alkylacryl-amino-$C_2$–$C_4$alkylamides are exemplified by acrylamide, methacrylamide, N,N-dimethylacrylamide, N,N-dimethyl (meth)acrylamide, 2-(N,N-dimethyl-aminoethyl)-acrylamide, 2-(N,N-dimethylaminoethyl)-methacrylamide, 2-(N,N-dimethyl-aminopropyl)-methacrylamide, 2-aminoethylacrylamide and 2-aminoethylmethacrylamide.

Vinyl substituted heterocycles are exemplified by vinylpyrrolidone, vinylimidazole, vinylcarbazole and vinylpyridine and amidosulfonic acid derivatives by 2-acrylamido-2-methylpropanesulfonic acid.

Di-$C_1$–$C_4$-alkylaminostyrene are exemplified by 4-N,N-dimethylaminostyrene.

The above-mentioned monomers containing functional groups may be derivatized to render them more hydrophilic as described in U.S. Pat. No. 4,656,226 and EP-A-311 157.

It is to be understood, that the above described functional monomers, especially basic monomers, can also be used in form of their corresponding salts. For example acrylates, methacrylates or styrenes containing amino groups can be used as salts with organic or inorganic acids or by way of quatemization with known alkylation agents like benzyl chloride. The salt formation can also be done as a subsequent reaction on the preformed block copolymer with appropriate reagents. In an other embodiment, the salt formation is done in situ in formulations, for example by reacting a block copolymer with basic or acidic groups with appropriate neutralization agents during the preparation of a pigment concentrate.

In a preferred embodiment of the invention the polymer blocks A or B or both are reaction products with reactive polar monomers selected from the group consisting of glycidyl acrylic or $C_1$–$C_4$-alkylacrylic acid esters, 2-isocyanatoethyl acrylic or $C_1$–$C_4$-alkylacrylic acid esters and $C_3$–$C_8$-alkyl- or $C_3$–$C_8$-alkenyl-dicarboxylic acid anhydrides.

x represents a numeral greater than one and defines the number of monomer repeating units in A. The lowest number is two. A preferred range of x is from 2 to 1000.

y represents zero or a numeral greater than zero and defines the number of monomer repeating units in B. A preferred range of y is from 0 to 1000.

In a block copolymer (I) the preferred molecular weight range of blocks A and B is from about 1 000 to 100 000 and particularly from about 1 000 to 50 000. A highly preferred range is from about 2 000 to 15 000.

In a block copolymer (I) the group X represents a polymer chain terminal group. This terminal group is determined by the polymerization initiators used in the ATRP method, especially halogen, especially chlorine or bromine. Halogen may be undesirable as a chain terminal group and can be replaced in a subsequent step by other chain terminal groups derived from TEMPO (=2,2,6,6-TetraMethylPiperidyl-1-Oxide) and derivatives thereof as represented by the partial formula:

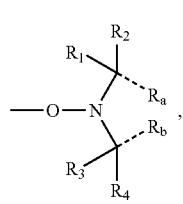
(A₀)

wherein
one of $R_1$ and $R_2$ represents $C_1$–$C_7$-alkyl and the other represents $C_1$–$C_4$-alkyl or $C_1$–$C_4$-alkyl substituted by $C_1$–$C_4$-alkoxycarbonyl or $C_1$–$C_4$-alkoxy; or
$R_1$ and $R_2$ together with the adjacent carbon atom both represent $C_3$–$C_7$-cycloalkyl;
$R_3$ and $R_4$ are as defined as $R_1$ and $R_2$;
$R_a$ represents $C_1$–$C_4$-alkyl, cyano, $C_1$–$C_4$-alkoxycarbonyl, $C_1$–$C_4$-alkanoyloxy, $C_1$–$C_4$-alkanoyl-oxy-$C_1$–$C_4$-alkyl, carbamoyl, mono- or di- $C_1$–$C_4$-alkylcarbamoyl, mono- or di-2-hydroxy-ethylcarbamoyl, amidino, 2-imidazolyl, 1-hydroxy-2-hydroxymethyl-2-propylcarbamoyl, or 1,1-dihydroxymethyl-2-hydroxycarbamoyl; and
$R_b$ is as defined as $R_a$; or
$R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulfur.

A preferred embodiment relates to a group of the formula:

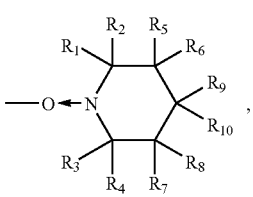
(A₁)

which is substituted in 4-position by one or two substituents.
In the partial formula $A_1$
$R_1$, $R_2$, $R_3$ and $R_4$ represent $C_1$–$C_4$-alkyl;
$R_5$, $R_6$, $R_7$ and $R_8$ represent hydrogen; and
one of $R_9$ and $R_{10}$ independently of the other represents hydrogen or substituents or $R_9$ and $R_{10}$ both represent substituents.

Representative examples of a group of the formula $A_1$ are the groups:

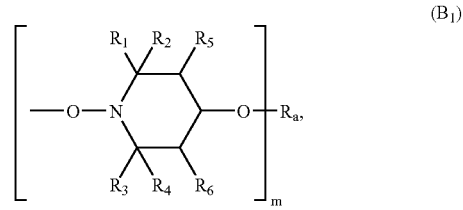
(B₁)

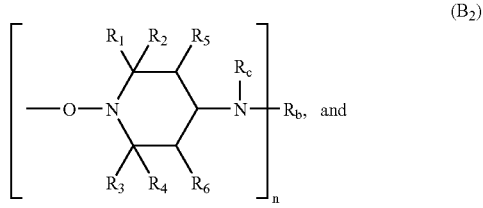
(B₂)

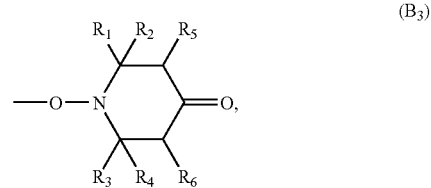
(B₃)

wherein
m represents 1;
$R_a$ represents hydrogen, $C_1$–$C_{18}$-alkyl which is uninterrupted or interrupted by one or more oxygen atoms, 2-cyanoethyl, benzoyl, glycidyl, or represents a monovalent radical of an aliphatic carboxylic acid having 2 to 12 carbon atoms, of a cycloaliphatic carboxylic acid having 7 to 15 carbon atoms, of an a,b-unsaturated carboxylic acid having 3 to 5 carbon atoms or of an aromatic carboxylic acid having 7 to 15 carbon atoms;
m represents 2;
$R_a$ represents a divalent radical of an aliphatic dicarboxylic acid having 2 to 36 carbon atoms;
n represents 1;
$R_b$ represents $C_1$–$C_{12}$-alkyl, $C_5$–$C_7$-cycloalkyl, $C_7$–$C_8$-aralkyl, $C_2$–$C_{18}$-alkanoyl, $C_3$–$C_5$-alkenoyl or benzoyl; and
$R_c$ represents $C_1$–$C_{18}$-alkyl, $C_5$–$C_7$-cycloalkyl, $C_2$–$C_8$-alkenyl unsubstituted or substituted by a cyano, carbonyl or carbamide group, glycidyl, or represents a group of the formula —CH₂CH(OH)-Z, —CO-Z or —CONH-Z, wherein Z is hydrogen, methyl or phenyl.

Another particularly preferred embodiment relates to the group $A_1$, wherein one of $R_9$ and $R_{10}$ represents hydrogen and the other one $C_1$–$C_4$-alkanoylamino.

Component b)
Suitable dispersible organic pigments are selected from the group consisting of are selected from the azo pigment group consisting of azo, disazo, napthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, pigments, pearlescent flakes and the like. Further examples of organic pigments can be found in the monograph: W.

Herbst, K. Hunger *"Industrielle organische Pigmente"* 2$^{nd}$ Edition, 1995, VCH Verlagsgesellschaft, ISBN: 3-527-28744-2.

Suitable dispersible inorganic pigments are selected from the group consisting of metallic flakes, such aluminum, aluminum oxide, calcium carbonate, silicon oxide and silicates, iron(III)oxide, chromium(III)oxide, titanium(IV)oxide, zirconium(IV)oxide, zinc oxide, zinc sulfide, zinc phosphate, mixed metal oxide phosphates, molybdenum sulfide, cadmiumsulfide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaoline.

The composition may contain in addition to component a)—polymers—and component b)—pigments—conventional binder materials for preparing coating compositions, e.g. paints, fillers, and other conventional additives selected from the group consisting of surfactants, stabilizers, antifoaming agents, dyes, plasticizers, thixotropic agents, drying catalysts, anti-skinning agents and leveling agents. The composition may also contain conventional additives, such as antioxidants, light stabilizers, e.g. UV stabilizers or absorbers, for example those of the hydroxyphenylbenzotriazole, hydroxyphenyl-benzophenone, oxalamide or hydroxyphenyl-s-triazine type, flow control agents, rheology control agents such as fumed silica, microgels, screeners, quenchers or absorbers. These additives can be added individually or in mixtures, with or without so-called sterically hindered amines (HALS).

The composition may contain the above-mentioned polymer component a) in an amount of 0.1 to 99.9% by weight, preferably 0.1 to 50.0% by weight and particularly preferably 1.0 to 30.0% by weight.

A particularly preferred embodiment of the invention relates to a composition comprising a) 0.1–99.9% by weight of a block copolymer (I), wherein In, X, p and q are as defined above;

A represents a polymer block consisting of repeating units of acrylic or methacrylic acid-$C_1$–$C_{24}$-alkyl esters;

B represents a polymer block consisting of repeating units of acrylic or methacrylic acid-$C_1$–$C_{24}$-alkyl esters which are copolymerized with at least 50% by weight of monomers carrying functional groups and wherein the monomers are selected from the group consisting of acrylic or methacrylic acid and salts thereof, acrylic or methacrylic acid-mono- or -di-$C_1$–$C_4$-alkylamino-$C_2$–$C_4$-alkyl esters and salts thereof, acrylic or methacrylic acid-hydroxy-$C_2$–$C_4$-alkyl esters, acrylic or methacrylamide, acrylic or methacrylic-mono- or -di-$C_1$–$C_4$-alkylamides, acrylic or methacryl-amino-$C_2$–$C_4$alkylamides, and vinyl substituted heterocycles selected from the group consisting of vinylpyrrolidone, vinylimidazole and vinylcarbazole;

x and y represent numerals greater than zero and define the number of monomer repeating units in A and B; and X represents a polymer chain terminal group; and b) 0.1–99.9% by weight of dispersible pigment particles.

Another embodiment of the invention relates to a process for preparing the above-mentioned composition containing components a) and b) and optionally binder materials, fillers or other conventional additives, which comprises copolymerizing by atom transfer radical polymerization (ATRP) fragments A and B in the presence of the polymerization initiator:

$$[In\underset{p}{\vphantom{X}}X_q, \quad (II)$$

wherein In, p and q are as defined above, and X represents Halogen and a catalytically effective amount of a catalyst capable of activating controlled atomic transfer radical polymerization (ATRP), replacing halogen X with a different polymer chain terminal group X' and adding dispersible pigment particles and optionally binder materials, fillers or other conventional additives.

The polymerization process may be carried out in the presence of water or an organic solvent or mixtures thereof. Additional cosolvents or surfactants, such as glycols or ammonium salts of fatty acids, may be added to the reaction mixture. The amount of solvent should be kept as low as possible. The reaction mixture may contain the above-mentioned monomers or oligomers in an amount of 1.0 to 99.9% by weight, preferably 5.0 to 99.9% by weight, and especially preferably 50.0 to 99.9% by weight, based on the monomers present in the polymerizate.

If organic solvents are used, suitable solvents or mixtures of solvents are typically pure alkanes (hexane, heptane, octane, isooctane), hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether, tetrahydrofurane), or mixtures thereof.

If water is used as a solvent the reaction mixture can be supplemented with a water-miscible or hydrophilic cosolvent. The reaction mixture will then remain in a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until full completion of the polymerization. Exemplary cosolvents useful in the process may be selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic solvents are selected for the process, the water to cosolvent weight ratio is typically in the range of about 100:0 to about 10:90.

When monomer mixtures or monomer/oligomer mixtures are used, the calculation of mol % is based on an average molecular weight of the mixture.

Hydrophilic monomers, polymers and copolymers of the present invention can be separated from one another or from the polymerization reaction mixture by, for example, distillation, precipitation, extraction, changing the pH of the reaction media or by other well known conventional separation techniques.

The polymerization temperature may range from about 50° C. to about 180° C., preferably from about 80° C. to about 150° C. At temperatures above about 180° C., the controlled conversion of the monomers into polymers may decrease, and undesirable by-products like thermally initiated polymers are formed or decomposition of the components may occur.

A suitable catalyst capable of activating controlled radical polymerization is a transition metal complex catalyst salt is present as an oxidizable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such hydride ions ($H^-$) or anions derived from inorganic or organic acids, examples being halides, e.g. $F^-$, $Cl^-$, $Br^-$ or $I^-$, halogen complexes with transition metals, such as $Cu^IBr_2^-$, halogen complexes of the type $BF_4^-$, $PF_6^-$, $SbF_6^-$ or $AsF_6^-$, anions of oxygen acids, alcoholates or acetylides or anions of cyclopentadiene.

Anions of oxygen acids are, for example, sulfate, phosphate, perchlorate, perbromate, periodate, antimonate, arsenate, nitrate, carbonate, the anion of a $C_1$–$C_8$carboxylic acid, such as formate, acetate, propionate, butyrate, benzoate, phenylacetate, mono-, di- or trichloro- or -fluoroacetate, sulfonates, for example methylsulfonate, ethylsulfonate, propylsulfonate, butylsulfonate, trifluoromethylsulfonate (triflate), unsubstituted or $C_1$–$C_4$alkyl-, $C_1$–$C_4$alkoxy- or halo-, especially fluoro-, chloro- or bromo-substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate, phosphonates, for example methylphosphonate, ethylphosphonate, propylphosphonate, butylphosphonate, phenylphosphonate, p-methylphenylphosphonate or benzylphosphonate, carboxylates derived from a $C_1$–$C_8$carboxylic acid, for example formate, acetate, propionate, butyrate, benzoate, phenylacetate, mono-, di- or trichloro- or -fluoroacetate, and also $C_1$–$C_{12}$-alcoholates, such as straight chain or branched $C_1$–$C_{12}$-alcoholates, e.g. methanolate or ethanolate.

Anionic ligands and neutral may also be present up to the preferred coordination number of the complex cation, especially four, five or six. Additional negative charges are counter-balanced by cations, especially monovalent cations such as $Na^+$, $K^+$, $NH_4^+$ or $(C_1$–$C_4alkyl)_4N^+$.

Suitable neutral ligands are inorganic or organic neutral ligands commonly known in complex chemistry of transition metals. They coordinate to the metal ion through a σ-, π-, μ-, η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i$-$C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine ($Me_6TREN$), catechol, N,N'-dimethyl-1,2-benzenediamine, 2-(methylamino)phenol, 3-(methylamino)-butanol or N,N'-bis(1,1-dimethylethyl)-1,2-ethanediamine, N,N,N',N'',N''-pentamethyldiethyl-triamine (PMDETA), $C_1$–$C_8$-glycols or glycerides, e.g. ethylene or propylene glycol or derivatives thereof, e.g. di-, tri- or tetraglyme, and monodentate or bidentate heterocyclic $e^-$ donor ligands.

Heterocyclic $e^-$ donor ligands are derived, for example, from unsubstituted or substituted heteroarenes from the group consisting of furan, thiophene, pyrrole, pyridine, bis-pyridine, picolylimine, γ-pyran, γ-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bisquinoline, isoquinoline, bis-isoquinoline, acridine, chromene, phenazine, phenoxazine, phenothiazine, triazine, thianthrene, purine, bis-imidazole and bis-oxazole.

The oxidizable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, $Me_6TREN$ or PMDETA.

After completing the polymerizing step process, the polymers obtained may be isolated or the N→O compound of the formula:

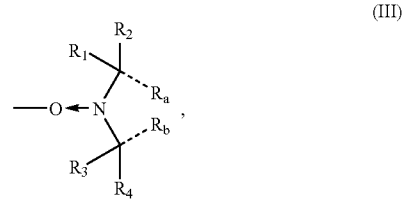

(III)

which corresponds to the group $A_0$ and wherein $R_1$–$R_4$ and $R_a$ and $R_b$ are as defined above, is added in-situ. The isolating step of the present process may be carried out by known procedures, e.g. by distilling and filtering off unreacted monomer. After completing the substitution of the polymerisate with the N→O compound (III), the catalyst salt is filtered off, followed by evaporation of the solvent or by precipitation of the N→O polymer (I) in a suitable liquid phase, filtering the precipitated polymer and washing and drying.

The elimination of the leaving group —X, e.g. halogen, and the substitution of the polymerisate with the N→O compound (III) is advantageously performed in such a way that the polymerisate is dissolved in a solvent and the N→O compound (III) is added. The reaction takes place within a temperature range from room temperature to the boiling temperature of the reaction mixture, preferably from room temperature to 100° C. The transition metal in the oxidizable transition metal complex catalyst salt is converted from its lower oxidation state in the above-mentioned redox systems to its higher oxidation state. In a preferred embodiment of the process a Cu(I) complex catalyst salt is converted to the corresponding Cu(II) oxidation state.

Because the present polymerization and derivatization with the N→O compound (III) by ATRP is a "living" polymerization, it can be started and terminated practically at will. The block copolymers (I) as obtained by the process have a low polydispersity. Preferably the polydispersity is from 1.01 to 2.2, more preferably from 1.01 to 1.9, and most preferably from 1.01 to 1.5.

The various advantages of the process of this type allowing flexible polymerization reactions are described by K. Matyjaszewski in *ACS Symp. Ser.* Vol. 685 (1998), pg. 2–30.

The polymers or copolymers can be further processed and used in most cases without any further purification step. This is an important advantage when industrial scale-up is intended. In specific cases it can be advantageous to modify the resultant block copolymer by additional reaction step(s) for example by (complete or partial) neutralization of incorporated aminofunctional monomers with organic or inorganic acids or by quatemization the same with strong alkylation agents.

The pigments are added to the polymer dispersant by using conventional techniques, such as high speed mixing, ball milling, sand grinding, attritor grinding or two or three roll milling. The resulting pigment dispersion may have a pigment to dispersant binder weight ratio of about 0.1:100 to 1500:100.

The invention also relates to the process for preparing the pigment dispersion, which comprises dispersing in a liquid carrier pigment particles in the presence of a block copolymer of the formula I, wherein I, A, B, X, x, y, p and q are as defined above.

The organic solvents present in the dispersion are mentioned above, cf. process, and preferably are polar, water-miscible solvents such as $C_1$–$C_4$alkohols, e.g. methanol, ethanol, or isopropanol, polyols, e.g. glycerol, or ethylene, diethylene, triethylene, triethylene or propylene glycol.

In a preferred embodiment of this process, fine pigment dispersions are prepared by mixing the pigments with a solution of the polymers, concentrating the resulting mixture by distilling off the solvents, preferably to dryness, and subjecting the resulting concentrate to thermal treatment to prepare a mixture comprising pigments and polymers which may then be subsequently dispersed in aqueous and/or organic solvents.

The above-mentioned methods for preparing the composition, such as high speed mixing, ball milling, sand grinding, attritor grinding or two or three roll milling may in the alternative be employed when preparing the dispersion.

Likewise of particular interest is a specific embodiment of the above-mentioned process for preparing the composition, wherein coating compositions, for example paints, are prepared. The invention therefore also relates to compositions, wherein film-forming binders c) for coatings are added.

The novel coating composition preferably comprises 0.01–10 parts by weight of the combined components a) and b) in the composition, in particular 0.05–10 parts, especially 0.1–5 parts, per 100 parts by weight of solid binder c).

The binder c) can in principle be any binder which is customary in industry, for example those described in *Ullmann's Encyclopedia of Industrial Chemistry*, 5th Edition, Vol. A18, pp. 368–426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air drying resins can be used.

Component c) can be any cold-curable or hot-curable binder; the addition of a curing catalyst may be advantageous. Suitable catalysts which accelerate curing of the binder are described, for example, in *Ullmann's*, Vol. A18, p.469.

Preference is given to coating compositions in which component c) is a binder comprising a functional acrylate resin and a crosslinking agent. Examples of coating compositions containing specific binders are:

1) paints based on cold- or hot-crosslinkable alkyd, acrylate, polyester, epoxy or melamine resins or mixtures of such resins, if desired with addition of a curing catalyst;
2) two-component polyurethane paints based on hydroxyl-containing acrylate, polyester or polyether resins and aliphatic or aromatic isocyanates, isocyanurates or polyisocyanates;
3) one-component polyurethane paints based on blocked isocyanates, isocyanurates or polyisocyanates which are deblocked during baking, if desired with addition of a melamine resin;
4) one-component polyurethane paints based on a tris-alkoxycarbonyltiazine crosslinker and a hydroxyl group containing resin such as acrylate, polyester or polyether resins;
5) one-component polyurethane paints based on aliphatic or aromatic urethaneacrylates or polyurethaneacrylates having free amino groups within the urethane structure and melamine resins or polyether resins, if necessary with curing catalyst;
6) two-component paints based on (poly)ketimines and aliphatic or aromatic isocyanates, isocyanurates or polyisocyanates;
7) two-component paints based on (poly)ketimines and an unsaturated acrylate resin or a polyacetoacetate resin or a methacrylamidoglycolate methyl ester;
8) two-component paints based on carboxyl- or amino-containing polyacrylates and polyepoxides;
9) two-component paints based on acrylate resins containing anhydride groups and on a polyhydroxy or polyamino component;
10) two-component paints based on acrylate-containing anhydrides and polyepoxides;
11) two-component paints based on (poly)oxazolines and acrylate resins containing anhydride groups, or unsaturated acrylate resins, or aliphatic or aromatic isocyanates, isocyanurates or polyisocyanates;
12) two-component paints based on unsaturated polyacrylates and polymalonates;
13) thermoplastic polyacrylate paints based on thermoplastic acrylate resins or externally crosslinking acrylate resins in combination with etherified melamine resins;
14) paint systems based on siloxane-modified or fluorine-modified acrylate resins.

In addition to the components mentioned above, the coating composition according to the invention preferably comprises a light stabilizer of the sterically hindered amine type, the 2-(2-hydroxyphenyl)-1,3,5-triazine and/or the 2-hydroxyphenyl-2H-benzotriazole type. Further examples for light stabilizers of the 2-(2-hydroxyphenyl)-1,3,5-triazine type advantageously to be added can be found e.g. in the published patent literature, e.g. U.S. Pat. No. 4,619,956, EP-A-434608, U.S. Pat. No. 5,198,498, U.S. Pat. No. 5,322,868, U.S. Pat. No. 5,369,140, U.S. Pat. No. 5,298,067, WO-94/18278, EP-A-704437, GB-A-2297091, WO-96/28431. Of special technical interest is the addition of the 2-(2-hydroxyphenyl)-1,3,5-triazines and/or 2-hydroxyphenyl-2H-benzotriazoles, especially the 2-(2-hydroxyphenyl)-1,3,5-triazines.

Apart from the components mentioned above, the coating composition can also comprise further components, examples being solvents, pigments, dyes, plasticizers, stabilizers, thixotropic agents, drying catalysts and/or leveling agents. Examples of possible components are those described in *Ullmann's*, Vol. A 18, pp. 429–471.

Possible drying catalysts or curing catalysts are, for example, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti or Zr, or organometallic compounds such as organotin compounds.

Examples of metal carboxylates are the stearates of Pb, Mn or Zn, the octanoates of Co, Zn or Cu, the naphthenoates of Mn and Co or the corresponding linoleates, resinates or tallates.

Examples of metal chelates are the aluminum, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyidiethanolamine, N-dimethylethanolamine, N-ethylmorpholine, N-methylmorpholine or diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

The novel coating compositions can also be radiation-curable coating compositions. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the above-mentioned publication *Ullmann's*, Vol. A 18, pages 451–453. In radiation-curable coating compositions, the novel stabilizers can also be employed without the addition of sterically hindered amines.

The coating compositions according to the invention can be applied to any desired substrates, for example to metal, wood, plastic or ceramic materials. They are preferably used as topcoat in the finishing of automobiles. If the topcoat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by the customary methods, for example by brushing, spraying, pouring, dipping or electrophoresis; see also *Ullmann's*, Vol. A18, pp. 491–500.

Depending on the binder system, the coatings can be cured at room temperature or by heating. The coatings are preferably cured at 50–150° C., and in the case of powder coatings or coil coatings even at higher temperatures.

The coatings obtained in accordance with the invention have excellent resistance to the damaging effects of light, oxygen and heat; particular mention should be made of the good light stability and weathering resistance of the coatings thus obtained, for example paints.

The invention therefore also relates to a coating, in particular a paint, which has been stabilized against the damaging effects of light, oxygen and heat by a content of the compound of the formula (I) according to the invention.

The paint is preferably a topcoat for automobiles. The invention furthermore relates to a process for stabilizing a coating based on organic polymers against damage by light, oxygen and/or heat, which comprises mixing with the coating composition a mixture comprising a compound of the formula (I), and to the use of mixtures comprising a compound of the formula (I) in coating compositions as stabilizers against damage by light, oxygen and/or heat.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in *Ullmann's*, A18, pages 438–444. The powder coating material may also have the form of a powder-slurry (dispersion of the powder preferably in water).

Likewise preferred is the use of the coating composition as a topcoat for applications in the automobile industry, especially as a pigmented or unpigmented topcoat of the paint finish. Its use for underlying coats, however, is also possible.

The above-mentioned coating compositions or disperse systems may additionally contain fillers, such as calcium carbonate, silicates, glass fibers, glass beads, talc, kaolin, mica, barium sulfate, metal oxides and hydroxides, carbon black, graphite, wood powders, powders and fibers of other natural products, synthetic fibers, plasticisers, lubricants, emulsifiers, pigments, rheology additives, catalysts, flow auxiliaries, optical brighteners, flame retardants, antistatics, blowing agents.

The following examples illustrate the invention.

EXAMPLE 1

Dispersions and Pigmented Coatings Containing Block Copolymers Made By ATRP

1. Materials and Methods 1.1 Preparation of Polymers 1.1.1 Preparation of poly-n-butylacrylate with Terminal Br-Groups By the ATRP Method without the Addition of Solvent ([M]:[I]:[CuBr]:[L]=40:1:0.2:0.2).

898.00 g (1000 ml, 7.0 mol) n-butylacrylate (Fluka, purum) and 5.02 g (35.0 mmol) CuBr (Fluka, purified by treatment with acetic acid) are added to a 1500 ml round flask equipped with a mechanical stirrer. The air is removed from the flask by stirring, evacuating and rinsing with nitrogen three times. 6.06 g (7.3 ml, 35 mmol) PMDETA (N,N,N',N'',N''-pentamethyldiethyltriamine: Fluka/purum) are added through the rubber sealing with a syringe. After addition of 29.22 g (19.51 ml, 175 mmol) methyl-2-bromopropionate (initiator MBP) with a syringe and heating up to 80° C. in the oil bath the exothermal polymerization reaction is started. The temperature rises quickly to 110° C. and is controlled at a level of 100–105° C. The mixture is polymerized for 75 min. The amount produced is determined by $^1$H-NMR-analysis in $CDCl_3$ (98% after 75 min.) After cooling to room temperature 800 ml ethyl acetate and 300 g neutral aluminum oxide (ALOX) are added. After stirring the mixture for 1 h at room temperature, filtration, drying in the rotary evaporator at 80° C. and additional drying with a vacuum pump the polymer is obtained.

Elementary analysis:

|  | C | H | Br |
|---|---|---|---|
| calc. | 64.38 | 9.26 | 1.59 |
| found | 64.51 | 9.27 | 1.23 |

Cu: <10 ppm (X-ray fluorescence); GPC (THF): $M_n$: 4970, $M_w$: 6270, PDI: 1.26; Yield: 845 g (92%).

1.1.2 Preparation of a Block Copolymer of n-butylacrylate and 2-dimethylaminoethyl Acrylate with Terminal Br-Groups By the ATRP Method ([M]:[MI]:[CuBr]:[L]=10:2:1:1; MI: Macroinitiator).

100.00 g poly-n-butylacrylate (1.1.1) and 1.437 g (10.0 mmol) CuBr (Fluka, purified by treatment with acetic acid) are added to a 150 ml round flask equipped with a mechanical stirrer. The air is removed from the flask by stirring, evacuating and rinsing with nitrogen three times. The mixture is stirred and 14.37 g (15.35 ml, 100 mmol) 2-dimethylaminoethyl acrylate (BASF, technical quality) are added through the rubber sealing with a syringe. The air is removed again from the flask by evacuating and rinsing with nitrogen three times. 1.74 g (2.1 ml, 10 mmol) PMDETA (Fluka/purum) are added with a syringe, and the mixture is made homogeneous by stirring. After heating up to 80° C. in the oil bath the slightly exothermal polymerization reaction is started and the temperature rises up to 87° C. The mixture is polymerized for 80 min. The conversion is determined by $^1$H-NMR-analysis in CDCl$_3$ (70%). After cooling to room temperature 400 ml ethyl acetate and 150 g neutral aluminum oxide (ALOX) are added. The polymer is obtained after stirring for 40 min. at room temperature, filtration and drying in the rotary evaporator at 80° C. and drying in the vacuum pump.

Elementary analysis:

|  | C | H | N | Br |
|---|---|---|---|---|
| calc. | 63.65 | 9.25 | 1.23 | 1.40 |
| found | 64.37 | 8.77 | 0.83 | 0.59 |

Cu: <57 ppm (X-ray fluorescence); GPC (THF): $M_n$: 8830, $M_w$: 7760, PDI: 1.33; Yield: 94.62 g (83%).

1.1.3 Preparation of a Block Copolymer of n-butylacrylate and 2-hydroxyethyl Acrylate with Terminal Br-Groups By the ATRP Method ([M]:[MI]:[CuBr]:[L]=10:2:1:1).

100.00 g poly-n-butylacrylate (1.1.1) and 1.437 g (10.0 mmol) CuBr (Fluka, purified by treatment with acetic acid) are added to a 150 ml round flask equipped with a mechanical stirrer. The air is removed from the flask by stirring, evacuating and rinsing with nitrogen three times. The mixture is stirred and 11.66 g (10.54 ml, 100 mmol) 2-dimethylaminoethyl acrylate (HEA, Fluka, purum) are added through the rubber sealing with a syringe. The air is removed again from the flask by evacuating and rinsing with nitrogen three times. 1.74 g (2.1 ml, 10 mmol) PMDETA (Fluka/purum) are added with a syringe, and the mixture is made homogeneous by stirring. After heating up to 80° C. in the oil bath for one hour and control by 1H-NMR-analysis in CDCl$_3$, the conversion reached almost 100%. After cooling to room temperature, adding 1000 ml ethyl acetate and 200 g neutral aluminum oxide (ALOX), stirring for 40 min. at room temperature, filtration, and drying in the rotary evaporator at 80° C. and the vacuum pump, the polymer is obtained.

Elementary analysis:

|  | C | H | Br |
|---|---|---|---|
| calc. | 63.04 | 9.02 | 1.44 |
| found | 63.74 | 9.25 | 0.61 |

Cu: <46 ppm (X-ray fluorescence); GPC (THF): $M_n$: 7000, $M_w$: 12000, PDI: 1.72; Yield: 91.76 g (82%).

1.1.4 Preparation of Additional Block Copolymers 1.1.4.1

1.1.4.1.1 n-Butyl acrylate (n-BA) is polymerized with MBP according to Ex. 1.1.1 to obtain linear poly(n-BA) with Br-end groups ($M_n$=5620, $M_w$=6690, PDI=1.19, Br (found): 1.22%).

1.1.4.1.2

120.0 g poly(n-BA), see Ex. 1.1.1.4.1, and 1.61 g (12.2 mmol) CuBr (Fluka, purified by treatment with acetic acid) are added to a 350 ml round flask equipped with a mechanical stirrer. The air is removed by stirring, evacuating and rinsing three times with nitrogen. 38.82 g (41.4 ml, 271 mmol) 2-dimethylaminoethyl acrylate (BASF, technical quality) are added with a syringe through the rubber septum. The air is removed again from the mixture by evacuating and rinsing with nitrogen. After making the mixture homogeneous by stirring 2.58 g (3.0 ml, 12.2 mmol) Me$_6$TREN (synthesized by methylating tris-(2-aminoethyl)amine (=TREN) with formaldehyde according to Beilstein E IV, Vol. 4, pg. 1251; El. Anal.: % calc. C: 62.55, H: 13.12, N: 24.32, % found C: 62.22, H: 13.29; N: 24.54) is added. The polymerization then is started, and the temperature rises to 60° C. After one hour of polymerization time the mixture is purged with air, and the conversion is determined by $^1$H-NMR analysis in CDCl$_3$ (90%). 300 ml ethyl acetate and 60 g neutral aluminum oxide (ALOX) are added. The polymer is obtained after stirring for 1 h at room temperature, filtration and drying at 100° C. under vacuum in the rotary evaporator.

Yield: 145.6 g (94%).

Elementary analysis:

|  | C | H | N | Br |
|---|---|---|---|---|
| calc. | 63.30 | 9.28 | 2.44 | 1.14 |
| found | 63.51 | 9.35 | 2.12 | 0.44 |

GPC (THF): $M_n$=7320, $M_w$=9300, PDI=1.27.

1.1.4.1.3

80 g Poly(BA-b-DMAEA), cf. Ex. 1.1.4.1.2, is dissolved in 58.32 g (66.2 ml) ethyl acetate in a 350 ml round flask equipped with a mechanical stirrer. 7.49 g (59.2 mmol, 50% of the amine content of the block copolymer) benzyl chloride (Fluka, puriss) are added thereto. The mixture is homogenized with stirring and heated to 85° C. for 2 h. The effective quatemization of the tertiary amino group in the copolymer is ca. 50%, as proven by $^1$H-NMR in CDCl$_3$ (change of the chemical shift of ca. 50% of the benzylic methylene group protons from 4.6 to 4.9 ppm). After cooling the yellow solution (60 wt % polymer in EtOAc) is used for preparing the compositions. Yield: 139.6 g (96%), GPC (DMF): $M_n$=7400, $M_w$=9470, PDI=1.28.

1.1.4.1.4

80 g Poly(BA-b-DMAEA), cf. Ex. 1.1.4.1.2, is dissolved in 62.78 g (71.3 ml) ethyl acetate in a 350 ml round flask equipped with a mechanical stirrer. 14.18 g (112 mmol, 95% of the amine content of the block copolymer) benzyl chloride (Fluka, puriss) are added thereto. The mixture is homogenized with stirring and heated to 85° C. for 2 h. Due to increasing viscosity the mixture is diluted with additional 125.5 g (142 ml) EtOAc. The quaternization of the tertiary amino group of the copolymer is ca. 95%, as proven by $^1$H-NMR in CDCl$_3$: change of the chemical shift of ca. 95% of the benzylic methylene group protons from 4.8 to 5.1 ppm. After cooling the yellow solution (30 wt % polymer in EtOAc) is used for preparing the compositions. Yield: 290.9 g (93%), GPC (DMF): $M_n$=6160, $M_w$=8930, PDI=1.45.

1.1.4.1.5

83 g Poly(BA-b-DMAEA), cf. Ex. 1.1.4.1.2, is dissolved in 245.4 g (279 ml) ethyl acetate in a 350 ml round flask equipped with a mechanical stirrer. 22.17 g (116 mmol, 95% of the amine content of the block copolymer) p-toluene sulfonic acid monohydrate (Merck p.a.) are added thereto. The mixture is homogenized with stirring for 2 h at room temperature. The protonation of the tertiary amino group of the copolymer is ca. 95%, as proven by $^1$H-NMR in CDCl$_3$: change of the chemical shift of ca. 95% of the —N(CH$_3$)$_2$ group protons from 2.2 to 3.3 ppm. After cooling the yellow solution (30 wt % polymer in EtOAc) is used for preparing the compositions. Yield: 342.7 g, GPC (DMF): $M_n$=6160, $M_w$=8930, PDI=1.45.

1.1.4.2.1 n-Butyl acrylate (n-BA) is polymerized with MBP according to Ex. 1.1.1 to obtain linear poly(n-BA) with Br-end groups ($M_n$=13780, $M_w$=15640, PDI=1.13, Br (found): 0.48%.

1.1.4.2.2

The synthesis is performed as described in Ex. 1.1.4.1.2 with 120.0 g poly(n-BA), see Ex. 1.1.4.2.1, 0.62 g (4.35 mmol) CuBr, 17.95 g (125 mmol) 2-dimethylamino-ethyl acrylate (DMAEA) and 1.0 g (3.0 ml, 4.35 mmol) Me$_6$TREN. 4 h polymerization time at room temperature is needed for the conversion ($^1$H-NMR, CDCl$_3$:90%). Yield: 139.8 g (98%).

Elementary analysis:

|  | C | H | N | Br |
|---|---|---|---|---|
| calc. | 64.31 | 9.34 | 1.24 | 0.54 |
| found | 64.33 | 9.52 | 1.16 | 0.18 |

GPC (THF): $M_n$=15480, $M_w$=18730, PDI=1.21.

1.1.4.3

The synthesis is performed as described in Ex. 1.1.4.1.2 but with CuCl as catalyst, PMDETA as ligand precursor and Br-terminated poly(n-BA).

120.0 g poly(n-BA), see Ex. 1.1.4.1, 1.90 g (19.2 mmol) CuCl (Fluka, purified by treatment with acetic acid), 41.95 g (226 mmol) tert-butyl-aminoethyl acrylate (tBAEMA, AGIFLEX FMA, Ciba S.C. (Allied Colloids)), 3.33 g (4.0 ml, 19.2 mmol) PMDETA. 45 min. polymerization time at 90° C. Conversion ($^1$H-NMR, CDCl$_3$): ca. 100%. Yield: 147.4 g (91%).

Elementary analysis:

|  | C | H | N | Cl |
|---|---|---|---|---|
| calc. | 64.94 | 9.62 | 2.06 | 0.49 |
| found | 64.98 | 9.67 | 1.77 | 0.22 |

GPC (DMF): $M_n$=9520, $M_w$=11610, PDI=1.22.

1.1.4.4.1 n-Butyl acrylate (n-BA) is polymerized with MBP according to Ex. 1.1.1 to obtain linear poly(n-BA) with Br-end groups; $M_n$=4970, $M_w$=6270, PDI=1.26, Br (found): 1.24%.

1.1.4.4.2

135.4 g poly(n-BA), see Ex. 1.1.4.41 above, and 3.9 g (27.2 mmol) CuBr (Fluka, purified by treatment with acetic acid) are added to a 350 ml round flask equipped with a mechanical stirrer. The air is removed by stirring, evacuating and rinsing with nitrogen three times. 52.26 g (59.2 ml, 271 mmol) tert-butyl acrylate (tBA, Fluka, puriss) are added through the rubber septum with a syringe. The air is removed again from the mixture by evacuating and rinsing with nitrogen. The mixture is heated to 90° C. on an oil bath and made homogeneous by stirring. 4.71 g (5.67 ml, 27.2 mmol) PMDETA is added with a syringe thus initiating a slightly exothermic polymerization reaction. After 2 h of reaction time the mixture is cooled to room temperature and purged with air. The conversion is determined by $^1$H-NMR-analysis in CDCl$_3$ and is about 100%. 2×150 ml ethyl acetate and 2×100 g neutral aluminum oxide (ALOX) are added to the reaction mixture which is then stirred each time for 1 h at room temperature stirred and filtered. The pure dried polymer is obtained after evaporating the solvent in a rotary evaporator at 80° C. for 1 h with a vacuum pump. Yield: 168.9 g (90%), GPC (THF): $M_n$=8220, $M_w$=11100, PDI=1.34.

1.1.4.4.3

100.0 g of the polymer (poly(BA-b-tBA)), see Ex. 1.1.1.4.4.2, is dissolved in 100 ml methylene chloride in a 500 ml round bottom flask equipped with mechanical stirring. 74.34 g (49.89 ml, 3 equivalents relative to tBA content of the block copolymer) trifluoroacetic acid (TFA), are added thereto. The mixture is stirred for 22 h at room temperature. The solvents (CH$_2$Cl$_2$ and TFA) are removed in the rotary evaporator (1 h, 80° C., p<0.1 mbar). Yield: ca. 100%. The cleavage of the tert-butyl group is quantitative as proven by the $^1$H-NMR (DMSO-d$_6$): disappearance of signal at 1.4 ppm and appearance of signal at 12.1 ppm (—COOH). GPC (THF): $M_n$=5670; $M_w$=6920; PDI=1.22; Acid content (titration): 2.20 meq./g.

2. Experimental

The performance of the different block copolymers is evaluated in a "concentrated" polyester millbase and corresponding coating formulations made therefrom. A polyester millbase formulation is used to test the rheological behavior at relatively high pigment loadings. The millbase-formulation is used to grind and disperse the pigments. After defined grinding (2 h, Scandex-Mixer) the viscosity of the dispersion is measured at different shear rates with a cone plate viscosimeter. Reduction of the viscosities is indicative for dispersant efficiency, especially at low shear rates. The reference formulation contains no dispersant, but the same weight ratio of pigment versus polymer (=binder+dispersant) is maintained in each case. A letdown formulation (=final lacquer) is prepared from the millbase concentrate and applied to a transparent plastic film substrate or a glass plate and cured at high temperature. Gloss measurements were done on the cured coatings to characterize the dispersion quality of the pigment in the finished coating. Improved gloss is indicative for good dispersion of the pigment. In each case the reference formulation contains the same ratio of pigment versus polymer (=polyester+CAB+Melamine-crosslinker+dispersant). The following block copolymers were used:

| Composition (wt %)[1] | Polymer | Initiator | Molecular weight[2] |
|---|---|---|---|
| P(BA-b-DMAEA) = 88–12 | 1 | MBP | Mw = 6250, Mn = 7870; PDI = 1.26 |
| P(BA-b-HEA) = 90–10 | 2 | MBP | Mw = 7630, Mn = 12510 PDI = 1.61 |
| P(BA-b-DMAEA) = 76–24 | 3 | MBP | $M_n$ = 7320, $M_w$ = 9300, PDI = 1.27 |
| P(BA-b-DMAEA) = 87–13 | 4 | MBP | $M_n$ = 15480, $M_w$ = 18730, PDI = 1.21 |
| P(BA-b-tBAEMA) = 73–27 | 5 | MBP | $M_n$ = 9520, $M_w$ = 11610, PDI = 1.22 |
| P(BA-b-tBAEMA) = 73–27 | 6 | MBP | $M_n$ = 9520, $M_w$ = 11610, PDI = 1.22 |
| P(BA-b-DMAEA) = 87–13 (50% quaternized with BzCl) | 7 | MBP | $M_n$ = 7400, $M_w$ = 9470, PDI = 1.28 |
| P(BA-b-DMAEA) = 87–13 (50% neutralized with pTSA) | 9 | MBP | $M_n$ = 9590, $M_w$ = 11500, PDI = 1.20 |
| P(BA-b-DMAEA) = 87–13 (95% neutralized with pTSA) | 10 | MBP | $M_n$ = 6160, $M_w$ = 8930, PDI = 1.45 |
| P(BA-b-AA) = 82–18 | 11 | MBP | $M_n$ = 5670, $M_w$ = 6920, PDI = 1.22 |
| P(BA-b-AA) = 85–15 (neutralized with 50% TOA | 12 | MBP | $M_n$ = 5800, $M_w$ = 10340, PDI = 1.30 |

[1]BA = Butylacrylate,
DMAEA = Dimethylaminoethyl acrylate,
HEA = Hydroxyethyl acrylate,
AA = Acrylic acid,
tBAEMA = t.-butylaminoethyl methacrylate,
MBP = methyl-2-bromopropionate,
BzCl = benzyl chloride,
pTSA = p-toluene sulfonic acid,
TOA = tris(ethylhexyl)-amine;
[2]molecular weights measured by GPC.

3. Results

As can be seen from the results with different organic pigments in Tables 1, 3 and 5, the millbase formulations containing block copolymers show improved rheology as compared to the reference without dispersant. In the final lacquer formulations, the block copolymers also show improvements in gloss, cf. Tables 2, 4 and 6.

TABLE 1

Performance evaluation in a polyester mill base concentrate containing the organic pigment Irgazin ® DPP Rubine FTX

| Millbase Formulation Components | Millbase 1[1] | Millbase 2 with Polymer 1 | Millbase 3 with Polymer 2 |
|---|---|---|---|
| Dynapol ® H700-08[2] (35%) | 43.43 | 34.29 | 34.29 |
| Xylene/Butylacetate (40/60) | 38.44 | 44.38 | 44.38 |
| Butylacetate | 2.13 | | |
| Polymer 1[3] (60% in Butylacetate) | | 5.33 | |
| Polymer 2[4] (60% in Butylacetate) | | | 5.33 |
| IRGAZIN DPP Rubine FTX | 16.00 | 16.00 | 16.00 |
| Total | 100.00 | 100.00 | 100.00 |
| Viscosities (mPas) at: | | | |
| 1 rad/s | 57010 | 41530 | 39480 |
| 2 rad/s | 31470 | 23550 | 23930 |
| 4 rad/s | 17670 | 14050 | 15240 |

[1]Reference without dispersants;
[2]DYNAPOL H700-08 = commercial polyester resin;
[3]Polymer 1.1.2;
[4]Polymer 1.1.3

TABLE 2

Performance evaluation in a letdown formulation with the organic pigment IRGAZIN DPP Rubine FTX

| Letdown Formulation Components | Lacquer 1 | Lacquer 2 | Lacquer 3 |
|---|---|---|---|
| Millbase | 31.25 | 31.25 | 31.25 |
| DYNAPOL H7001[1] (60%) | 17.27 | 17.27 | 17.27 |
| Maprenal ® MF 650[2] | 2.94 | 2.94 | 2.94 |
| CAB Solution[3] (20%) | 26.36 | 26.36 | 26.36 |
| Xylene/Butylacetate (40/60) | 22.18 | 22.18 | 22.18 |
| Total | 100.00 | 100.00 | 100.00 |
| % Gloss (at 60°) | 46 | 60 | 48 |

[1]DYNAPOL H700-08: commercial polyester resin;
[2]MAPRENAL: melamine hardener;
[3]CAB: cellulose acetate butyrate (type CAB 531.1)

TABLE 3

Performance evaluation in a polyester mill base concentrate containing the organic pigment IRGAZIN DPP Rubine TR:

| Millbase Formulation Components | Millbase 1[1] | Millbase 2[2] |
|---|---|---|
| Dynapol ® H700-08[3] (35%) | 32.57 | 25.71 |
| Xylene/Butylacetate (40/60) | 53.83 | 58.29 |
| Butylacetate | 1.60 | |
| Polymer[4] (60% in Butylacetate) | | 4.00 |
| IRGAZIN DPP Rubine TR | 12.00 | 12.00 |
| Total | 100.00 | 100.00 |
| Viscosities (mPas) at: | | |
| 1 rad/s | 32700 | 21070 |
| 2 rad/s | 17380 | 11400 |
| 4 rad/s | 10590 | 8334 |

[1]Reference without Dispersant;
[2]with polymer 1;
[3]DYNAPOL H700-08 = commercial polyester resin;
[4]Polymer Ex. 1.1.2

TABLE 4

Performance evaluation in a letdown formulation with the organic pigment IRGAZIN DPP Rubine TR

| Letdown Formulation Components | Lacquer 1 | Lacquer 2 |
|---|---|---|
| Millbase | 41.67 | 41.67 |
| DYNAPOL H700[1] (60%) | 17.27 | 17.27 |
| Maprenal ® MF 650[2] | 2.94 | 2.94 |

TABLE 4-continued

Performance evaluation in a letdown formulation with
the organic pigment IRGAZIN DPP Rubine TR

| Letdown Formulation Components | Lacquer 1 | Lacquer 2 |
|---|---|---|
| CAB Solution[3] (20%) | 26.36 | 26.36 |
| Xylene/Butylacetate (40/60) | 11.77 | 11.77 |
| Total | 100.00 | 100.00 |
| % Gloss (at 60°) | 60 | 74 |

[1] DYNAPOL H700-08: commercial polyester resin;
[2] MAPRENAL: melamine hardener;
[3] CAB: cellulose acetate butyrate (type CAB 531.1)

TABLE 5

Performance evaluation in a polyester mill base concentrate
containing the organic pigment Cinquasia ® Scarlet RT-390-D:

| Millbase Formulation Components | Millbase 1[1] | Millbase 2[2] |
|---|---|---|
| Dynapol ® H700-08[3] (35%) | 54.29 | 42.83 |
| Xylene/Butylacetate (40/60) | 23.04 | 30.50 |
| Butylacetate | 2.67 | |
| Polymer[4] (60% in Butylacetate) | | 6.67 |
| IRGAZIN DPP Rubine FTX | 20.00 | 20.00 |
| Total | 100.00 | 100.00 |
| Viscosities (mPas) at: | | |
| 1 rad/s | 41670 | 15680 |
| 2 rad/s | 24960 | 10150 |
| 4 rad/s | 15290 | 6105 |

[1] Reference without dispersants;
[2] with polymer;
[3] DYNAPOL H700-08 = commercial polyester resin;
[4] Polymer 1.1.2; 3.1.6

TABLE 6

Performance evaluation in a letdown formulation with the
organic pigment CINQUASIA Scarlet RT-390-D:

| Letdown Formulation Components | Lacquer 1 | Lacquer 2 |
|---|---|---|
| Millbase | 25.00 | 25.00 |
| DYNAPOL H700[1] (60%) | 17.27 | 17.27 |
| Maprenal ® MF 650[2] | 2.94 | 2.94 |
| CAB Solution[3] (20%) | 26.36 | 26.36 |
| Xylene/Butylacetate (40/60) | 28.43 | 28.43 |
| Total | 100.00 | 100.00 |
| % Gloss (at 60°) | 60 | 74 |

[1] DYNAPOL H700-08: commercial polyester resin;
[2] MAPRENAL: melamine hardener;
[3] CAB: cellulose acetate butyrate (type CAB 531.1)

3.7 Table 7

In another set of experiments, the performance of different new block copolymer dispersants made by ATRP is compared with state of the art commercial dispersants. The same polyester formulation (DYNAPOL H700-08) as "Millbase 2" in Table 3 is used, except that the dispersion time is extended to 4 h. In all cases the same weight ratio of dispersant active polymer versus pigment of 20/100 is maintained. Letdown formulations are containing the pigment IRGAZIN DPP Rubine TR prepared according to lacquer 2 in Table 4 to compare the gloss of the cured coating. The results from Table 7 show that the new block copolymer dispersants improve the rheology in the millbase and/or the gloss of the cured lacquer.

TABLE 7

| Dispersant | Composition[1] | Viscosity Millbase at Shear Rate: (rad/sec) | | | Let down: |
|---|---|---|---|---|---|
| | | 1 | 16 | 128 | Gloss 20° |
| Solsperse ® 24000[2] | | 27700 | 4930 | 835 | 42 |
| Disperbyk ® 161[3] | | 30800 | 5830 | 963 | 42 |
| Efka 48[4] | | 32900 | 6900 | 1150 | 36 |
| 4 | P(BA-b-DMAEA) 76-24 | 12800 | 4820 | 874 | 27 |
| 5 | P(BA-b-DMAEA) 87-13 | 14900 | 5150 | 908 | 33 |
| 6 | P(BA-b-tBAEMA) 73-27 | 9280 | 5760 | 1040 | 18 |
| 7 | P(BA-b-DMAEA) 87-13 (50% quaternized with BzCl) | 37300 | 4430 | 663 | 54 |
| 8 | P(BA-b-DMAEA) 87-13 (95% quaternized with BzCl) | 33000 | 4500 | 702 | 57 |
| 9 | P(BA-b-DMAEA) 87-13 (50% neutralized with pTSA) | 23100 | 3540 | 547 | 55 |
| 10 | P(BA-b-DMAEA) 87-13 (95% neutralized with pTSA) | 14200 | 3680 | 576 | 53 |
| 11 | P(BA-b-AA) 82-18 | 35300 | 3480 | 561 | 41 |

TABLE 7-continued

| Dispersant | Composition[1] | Viscosity Millbase at Shear Rate: (rad/sec) | | | Let down: Gloss 20° |
| --- | --- | --- | --- | --- | --- |
| | | 1 | 16 | 128 | |
| 12 | P(BA-b-AA) 85-15 (neutralized with 50% TOA) | 17800 | 4030 | 615 | 43 |

[1]monomer composition given in wt %;
[2]SOLSPERSE: Reg. TM Avecia;
[3]DISPERBYK: Reg. TM BYK Chemie GmbH,
[4]Commercial Product Efka Chemicals;
DMAEA = dimethylaminoethyl acrylate;
tBAEMA = t.-butylaminoethyl methacrylate;
AA = acrylic acid;
BzCl = benzyl chloride;
pTSA = p-toluene sulfonic acid;
TOA = tris(ethylhexyl) amine.

We claim:

1. A process for preparing a composition comprising
a) 0.1–99.9% by weight of a block copolymer of the formula:

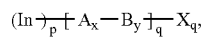
(I)

wherein:
In represents a polymerization initiator fragment of a polymerization initiator capable of initiating controlled atomic radical polymerization of ethylenically unsaturated monomers in the presence of a catalyst capable of activating controlled atomic radical polymerization selected from the group consisting of $C_1$–$C_8$-alkyl halides, $C_6$–$C_{15}$-aralkylhalides, $C_2$–$C_8$-haloalkyl esters, arene sulfonyl chlorides, haloalkanenitriles, α-haloacrylates and halolactones;
p represents one;
A represents a polymer block consisting of repeating units of acrylic or methacrylic acid-$C_1$–$C_{24}$-alkyl esters;
B represents a polymer block consisting of repeating units of acrylic or methacrylic acid-$C_1$–$C_{24}$-alkyl esters which are copolymerized with at least 50% by weight of monomers carrying functional groups and wherein the monomers are selected from the group consisting of acrylic or methacrylic acid and salts thereof, acrylic or methacrylic acid-mono- or -di-$C_1$–$C_4$-alkylamino-$C_2$–$C_4$-alkyl esters and salts thereof, acrylic or methacrylic acid-hydroxy -$C_2$–$C_4$-alkyl esters, acrylic or methacrylamide, acrylic or methacrylic-mono- or -di-$C_1$–$C_4$-alkylamides, acrylic acrylamide methacryl-amino-$C_2$–$C_4$alkylamides, and vinyl substituted heterocycles selected from the group consisting of vinylpyrrolidone, vinylimidazole or salts thereof and vinylcarbazole;
x and y represent numerals greater than zero and define the number of monomer repeating units in polymer blocks A and B;
X represents a polymer chain terminal group; and
q represents a numeral greater than zero; and
b) 0.1–99.9% by weight of dispersible inorganic or organic pigment particles,
provided that thermosetting compositions are excluded, which method comprises copolymerizing by atom transfer radical polymerization fragments A and B in the presence of polymerization initiator:

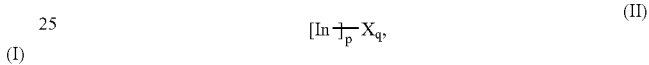
(II)

wherein, In, p and q are defined as above and X represents halogen and a catalytically effective amount of a catalyst capable of activating controlled atomic radical polymerization, replacing the halogen in formula (II) with a different polymer chain terminal group and adding dispersable pigment particles and optionally binder materials, fillers or other conventional additives.

2. A process for preparing a pigment dispersion comprising a dispersed phase consisting of
a) a block copolymer of the formula I,

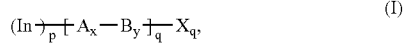
(I)

wherein:
In represents a polymerization initiator fragment of a polymerization initiator capable of initiating controlled atomic radical polymerization of ethylenically unsaturated monomers in the presence of a catalyst capable of activating controlled atomic radical polymerization selected from the group consisting of $C_1$–$C_8$-alkyl halides, $C_6$–$C_{15}$-aralkylhalides, $C_2$–$C_8$-haloalkyl esters, arene sulfonyl chlorides, haloalkanenitriles, α-haloacrylates and halolactones;
p represents one;
A represents a polymer block consisting of repeating units of acrylic or methacrylic acid-$C_1$–$C_{24}$-alkyl esters;
B represents a polymer block consisting of repeating units of acrylic or methacrylic acid-$C_1$–$C_{24}$-alkyl esters which are copolymerized with at least 50% by weight of monomers carrying functional groups and wherein the monomers are selected from the group consisting of acrylic or methacrylic acid and salts thereof, acrylic or methacrylic acid-mono- or -di-$C_1$–$C_4$-alkylamino-$C_2$–$C_4$-alkyl esters and salts thereof, acrylic or methacrylic acid-hydroxy -$C_2$–$C_4$-alkyl esters, acrylamide or methacrylamide, acrylic or methacrylic-mono- or -di-$C_1$–$C_4$-alkylamides, acrylic or methacryl-amino- $C_2$–$C_4$alkylamides, and vinyl substituted heterocycles selected from the group consisting of vinylpyrrolidone, vinylimidazole or salts thereof and vinylcarbazole;

x and y represent numerals greater than zero and define the number of monomer repeating units in polymer blocks A and B;

X represents a polymer chain terminal group; and q represents a numeral greater than zero;

b) dispersed pigment particles; and c) a liquid carrier selected from the group consisting of water, organic solvents and mixtures thereof which process comprises dispersing in the liquid carrier pigment particles in the presence of a block copolymer of the formula I.

* * * * *